United States Patent
Bureau et al.

(10) Patent No.: US 8,693,171 B2
(45) Date of Patent: Apr. 8, 2014

(54) CASING ASSEMBLY

(75) Inventors: David Bureau, Berkshire (GB); Tim Porter, Hampshire (GB); Caroline Millar, Surrey (GB); Kris Laurent, Hampshire (GB)

(73) Assignee: Nokia Corporation, Espoo (FI)

( * ) Notice: Subject to any disclaimer, the term of this patent is extended or adjusted under 35 U.S.C. 154(b) by 224 days.

(21) Appl. No.: 12/594,640

(22) PCT Filed: Apr. 4, 2007

(86) PCT No.: PCT/EP2007/003056
§ 371 (c)(1),
(2), (4) Date: Jun. 14, 2010

(87) PCT Pub. No.: WO2008/122296
PCT Pub. Date: Oct. 16, 2008

(65) Prior Publication Data
US 2010/0315765 A1 Dec. 16, 2010

(51) Int. Cl.
*H05K 5/00* (2006.01)
*A44C 17/02* (2006.01)
*H04B 1/38* (2006.01)

(52) U.S. Cl.
USPC .................. 361/679.01; 361/679.56; 63/29.1; 63/26; 455/90.3; 455/575.1

(58) Field of Classification Search
CPC ... G06F 1/1616; G06F 1/1656; G06F 1/1632; G06F 1/1626; A44C 15/0015; A44C 17/02; A44C 9/00; H04M 1/0283
USPC ............. 361/679.01, 679.56; 63/26, 29.1, 32; 455/90.3, 575.1, 575.8; 429/98, 100
See application file for complete search history.

(56) References Cited

U.S. PATENT DOCUMENTS

| | | | | |
|---|---|---|---|---|
| 1,069,254 | A | * | 8/1913 | Henning ........................ 63/29.1 |
| 4,220,016 | A | * | 9/1980 | Frenger .......................... 63/14.9 |
| 5,232,752 | A | * | 8/1993 | Crespi et al. ..................... 428/15 |
| 6,833,539 | B1 | * | 12/2004 | Maeda ..................... 250/214 AL |
| 6,928,834 | B2 | * | 8/2005 | Robertson et al. ................. 63/27 |
| 7,333,839 | B2 | * | 2/2008 | Hutchison et al. .......... 455/575.1 |
| 7,454,014 | B2 | * | 11/2008 | Nuovo .......................... 379/434 |

FOREIGN PATENT DOCUMENTS

| | | |
|---|---|---|
| FR | 2 843 859 | 3/2004 |
| FR | 2 849 356 | 7/2004 |
| WO | 86/04696 | 8/1986 |
| WO | 01/43577 | 6/2001 |

OTHER PUBLICATIONS

International Search Report and Written Opinion Received in the Corresponding PCT Application No. PCT/EP2007/003056 dated Dec. 12, 2007, p. 1-13.

* cited by examiner

Primary Examiner — Zachary M Pape
(74) Attorney, Agent, or Firm — Harrington & Smith

(57) ABSTRACT

A support for a fragile and/or brittle front piece includes a base plate member and a rim. The support is shaped to receive a specifically shaped piece of brittle material, such as ceramic, sapphire, precious or semi precious stone. The piece of brittle material has a front surface, a rear surface and sides. The rear surface is secured to a base plate of the support and a rim of the support surrounds the edges of the piece of brittle material.

20 Claims, 4 Drawing Sheets

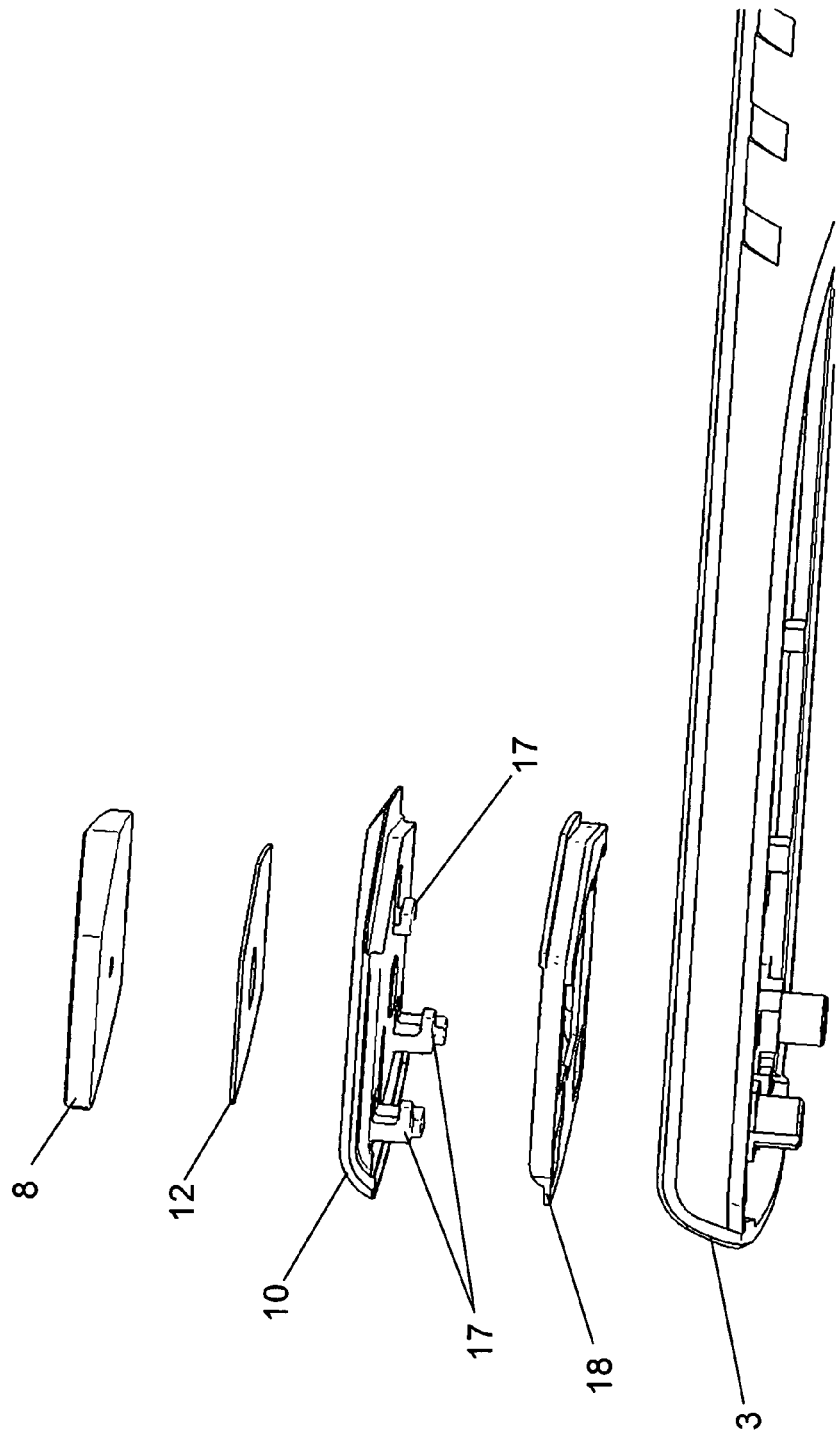

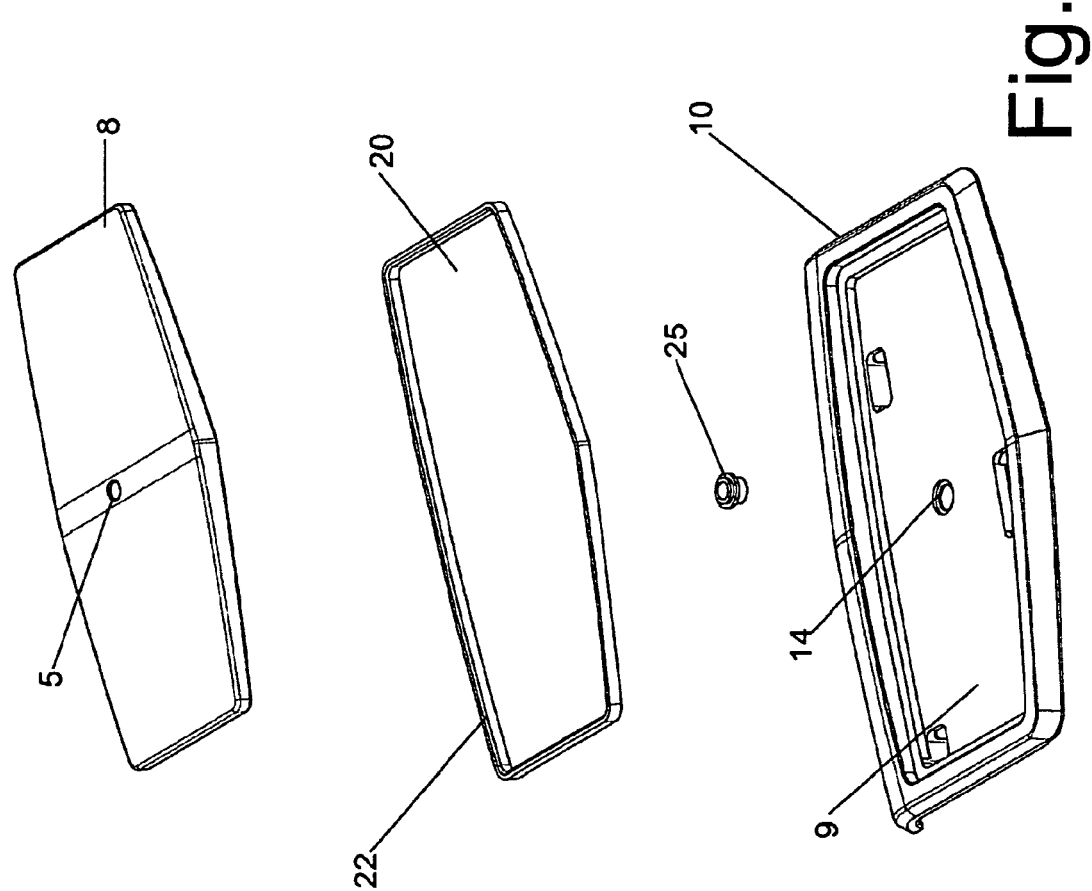

CASING ASSEMBLY

RELATED APPLICATION

This application was originally filed as PCT Application No. PCT/EP2007/003056 on Apr. 4, 2007, which is incorporated herein by reference in its entirety.

FIELD OF THE INVENTION

The present invention relates to supports for fragile and/or brittle pieces, in particular to supports for a fragile or brittle piece that are to be secured to a mobile device.

BACKGROUND OF THE INVENTION

The majority of mobile devices on the market are made of plastic and other relatively inexpensive materials. However, in the past years there has been a development within a section of the market towards luxury mobile devices.

These devices signal the same type of message as luxury watches, accessories and jewelry. Mobile devices, such as mobile phones or music players must be robust in order to maintain their luxury look after a period of intensive use. Some of the materials used in luxury products, such as ceramic, sapphire and semi precious stones are relatively brittle and/or fragile.

Parts of the cover of these devices may be formed or decorated by a piece of ceramic, sapphire or semi precious stone. In designing a durable device having, for example, a brittle material for a piece there are many difficulties. As soon as a mineral such as sapphire is used in place of other more flexible materials such as plastics, additional problems are introduced associated with the character of the material. In designing a durable device having, for example, a brittle material for a piece there are many difficulties.

In use, the mobile device may drop on the floor or hit another object while being carried. Thus, there is a substantial risk of such a piece of ceramic, sapphire or semi precious stones to be chipped, broken or otherwise damaged.

Conventionally, these relatively brittle and/or fragile pieces have been reinforced with a metal plate on their back. However, this solution is not always adequate for use in mobile devices.

DISCLOSURE OF THE INVENTION

On this background, it is an object of the present invention to provide support for a piece of brittle and/or fragile material that overcomes or at least reduces the drawbacks indicated above.

This object is achieved by providing a assembly comprising a piece of fragile and/or brittle decorative material and a support of relatively hard to break material, the piece comprising a front surface, a rear surface and sides, the support comprising a base plate, wherein the rear surface of the piece is secured to a substantially matching surface of the base plate and the support includes a rim that surrounds the sides of the piece.

The base plate that is attached to the rear of the piece of fragile and/or brittle material in combination with the rim that increases the rigidity of the support and increases the protection of the sides of the piece. This combination provides for a significantly increased resistance to damage from impact.

The support is shaped to receive a specifically shaped piece.

The support can be a part of a casing of a mobile device. In particular, the support can be a part of or on the casing of a mobile device.

The support can be provided with fastening elements for securing the support to the casing or frame of a mobile device.

The fastening elements may include clips.

The piece can be made of ceramic, glass, mineral, composite, sapphire, precious or semi precious stone. The piece can be a gem stone.

The relatively hard to break material can be a metal or a metal alloy, in particular, a titanium or a titanium alloy, gold or a gold alloy, platinum or a platinum alloy.

The relatively hard to break material can be metal or metal alloy with an amorphous atomic structure.

Alternatively, the hard to break material can be a fiber reinforced resin, such as a carbon fiber reinforced material.

The piece can be secured to the support by a bonding agent. By using a bonding agent in a large surface area a high-strength and stable connection between the support and the piece can be obtained. The bonding agent can be a heat adhesive. The bonding agent can be liquid adhesive. Spacers can be provided between the rear surface of the piece and the matching surface of the support.

Alternatively, the bonding agent can be a double-sided adhesive tape.

The rim can have a height that is less than the height of the edges of the piece.

The rim may follow the contour of the piece and there can be a small gap between the rim and the sides of the piece.

The assembly is can be earpiece cover, a battery cover, part of a front cover, part of the rear cover of a mobile electronic device.

The piece can be relatively flat and thin. The piece can be shaped similar to a plate.

The rim can be connected to the base plate along its full length.

The base plate and the rim can be formed by a unitary piece of hard to break material. The integral connection between the two elements will increase the overall stability and rigidity of the support.

The rim can be provided with slanting inner- and/or outer edges. The surfaces reduce the risk of damage to the rim and to other objects getting in touch with the rim.

It is another object of the present invention to provide a method of securing a piece of fragile and/or brittle material.

This object is achieved by providing a method for securing a piece of fragile and/or brittle material to a mobile device, the piece comprising a front surface, a rear surface and sides, the method comprising providing a support of relatively hard to break decorative material, said support including a base plate with a surface matching the rear surface of said piece, and said support including shaped and dimensioned to surround the sides of said piece with a narrow gap there between, placing said piece on the support with the rear surface of the piece facing the base plate and the rim of the support surrounding the sides of the piece, and securing the piece to the support.

Further objects, features, advantages and properties of the support and assembly according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which:

FIG. 3 is an exploded view from another angle of the upper part of the mobile device shown in FIGS. 1 and 2, and FIG. 4 is exploded view on another embodiment of the assembly according to the invention.

DETAILED DESCRIPTION OF PREFERRED EMBODIMENTS

In the following detailed description, the assembly according to the invention in the form of a support 10 with a piece 8 of brittle and/or fragile decorative material will be described by the preferred embodiments.

Figure 1:
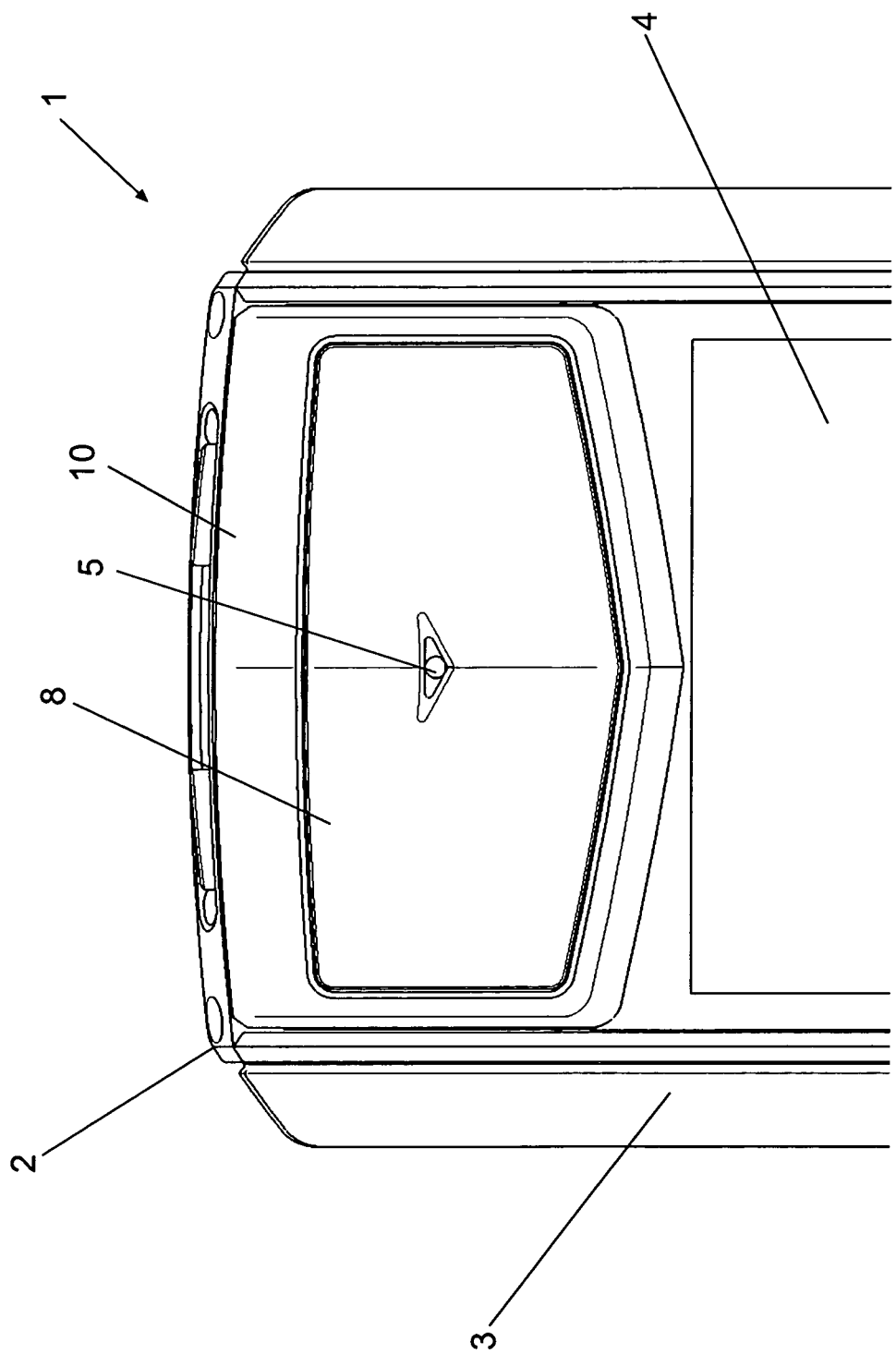
FIG. 1 is a front view on the upper part of a mobile device that is provided with an assembly according to an embodiment of the present invention.

FIG. 1 shows the upper part of a mobile device 1, which is in this embodiment a mobile phone. It is however noted that the mobile device 1 may just as well be a media player, a camera, a navigation device, a palmtop computer, or other mobile device.

The mobile phone 1 includes a casing 2 with the main structure being formed by a frame 3. The casing 2 includes a display cover 4. The frame 3 is made from a strong material, such as a metal or a fiber reinforced plastic or resin. The metals used for the frame 3 can be stainless steel, titanium, gold, platinum or an amorphous metal or alloys thereof.

A support 10 that is provided with a piece 8 of fragile and/or brittle decorative material 8 is secured to the frame 3. The piece 8 is provided with an opening 5 for allowing sound to pass from a speaker disposed under the support 10 (the speaker cannot be seen). In the present embodiment the support 10 is an earpiece cover.

The piece 8 has a mainly decorative function. The material used for the piece 8 can be ceramic, glass, mineral, sapphire, and precious or semi precious stone. The piece 8 can be a gemstone.

Figure 2:
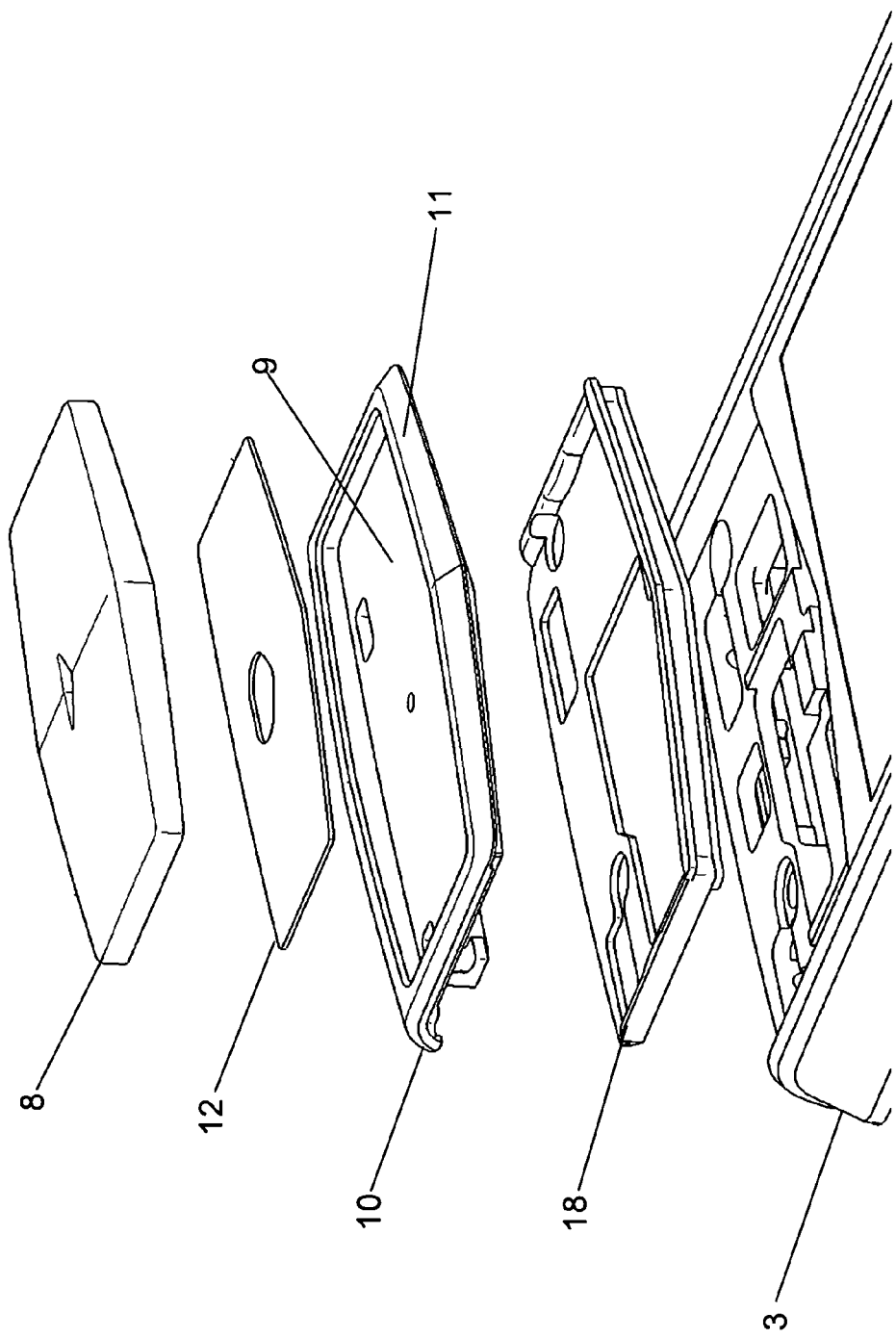
FIG. 2 is an exploded view from a first angle on the upper part of the mobile device shown in FIG. 1.

FIG. 2 is an elevated exploded view on the upper part of the mobile phone 1. The piece 8 has a flat and somewhat elongated shape that includes a front side, a rear side and sides that define the contour of the piece 8. The rear side of the piece 8 is secured to the support 10 by means of a layer of adhesive tape 12. The adhesive tape 12 is tacky on both sides and is provided with an opening for the speaker (the speaker cannot be seen).

The support 10 includes a base surface 9 that is shaped to match the rear surface of the piece 8. The matching shape of the base surface 9 and the rear surface of the piece 8 ensures that the adhesive tape 12 will adhere over the complete rear surface and base surface 9 for ensuring optimal support of the base surface 9 to the piece 8.

In another embodiment (not shown), the bonding agent between the piece 8 and the base surface 9 is liquid adhesive or a heat adhesive that becomes tacky when it is heated. The liquid adhesive can be composite glue. Spacers ensure correct thickness of the layer on the bonding agent between the rear side of the piece 8 and the base surface 9. These spacers can in an embodiment be formed by local protrusions on the rear surface of the piece 8 or on the base surface 9.

The support 10 is further provided with a rim 11 that surrounds the sides of the piece 8, i.e. the rim 11 substantially follows the contour of the piece 8.

In the present embodiment of the rim 11 is integral with the plate that forms the base surface 9. The plate that forms the base surface 9 and the rim and 11 may in an embodiment be formed by one single piece of material.

The rim 11 has a height that is sufficient for protecting the side of the piece 8. The rim 11 may be slightly higher than the sides of the front 8, but this is not an absolute requirement. The rim 11 may in another embodiment be equal or lower than the sides of the piece 8.

A small gap (in an embodiment approximately 0.1 to 0.2 mm) is provided between the sides of the piece 8 and the rim 11.

The rim 11 significantly increases the rigidity of the support 10. The high rigidity of the support 10 reduces the risk of the piece 8 being damaged upon impact.

Relatively strong and hard to break materials are used for the support 10. The material for the support should not be fragile or brittle like the material of the piece 8. Instead, the material for the support 10 should be relatively durable and tough, so that the support 10 is capable of maintaining its shape when exposed to a load or impact.

Examples of the materials for the support 10 are metals or fiber reinforced plastics or resins. The metals that can be used for the support 10 are stainless steel, titanium, gold, platinum, amorphous metals or alloys thereof. Otherwise carbon fiber reinforced resin or plastic is used in an embodiment.

In an embodiment, the rim 11 is provided with slanting inner- and/or outer edges that fulfill both a design and a practical function since slanted edges reduce the risk of damage to the rim 11 due to the absence of sharp edges, and at the same time the slanted edges reduce the risk of the rim 11 damaging other objects.

With reference to FIG. 3, the support 10 is secured to the frame 3 by clips 17 that project from the rear side of the support 10. The clips 17 engage slots in the frame 3. A gasket 18 of relatively soft material (such as silicone rubber) is placed between the support 10 and the frame 3 for improving the contact between the support 10 and the frame 3. The gasket 18 seals the speaker chamber (not shown) and is provided with an opening to allow sound from the speaker to leave the mobile phone 1. One or more screws (not shown) as are used to ensure that the clips 17 do not disengage.

According to another embodiment shown in FIG. 4, the piece 8 is secured to the support 10 using a plastic seal (be made from nylon or similar material. i.e. plastic) around the sides of the piece 8 and then pushing the piece 8 with the seal 20 into the support 10. The rim 22 that surrounds the back of the seal 20 will be squeezed in between the edges of the piece 8 and the rim 11 of the support 10. The tight fit of the rim 22 of the plastic seal 20 secures the piece 8 to the support 10. The base plate 9 of the support 10 includes an opening 14 in which an acoustic tube 25 is inserted. The acoustic tube 25 allows sound waves generated by the speaker to travel to the exterior. The piece 8 is provided with a similar channel 5 that is placed above and connects to the acoustic tube 25.

This embodiment allows additional decoration to be placed under the fragile and/or brittle piece 8 such as very thin cuts of stone or the like, which are protected by the piece 8.

Embodiments of the invention use precious and semi-precious materials including gem stones, other jewels and minerals, metals including those ranging from gold, silver, and platinum through to alloys such as steel. Materials such as ceramics in their various forms are also available for use in embodiments of the invention, the brittle nature of these materials, being able to be accommodated by the design of some embodiments.

Suitable materials for the piece are glass and other minerals, ceramics and precious and semi precious stones.

The assembly of the fragile and/or brittle piece 8 and the support can be used as a keymat face piece, an earpiece cover, a battery cover, part of a front cover or as a part of the rear cover of a mobile electronic device.

The invention has numerous advantages. Different embodiments or implementations may yield one or more of the following advantages. It should be noted that this is not an exhaustive list and there may be other advantages which are not described herein. One advantage of the invention is that it allows for and improved protection of a fragile and/or brittle piece. Another advantage of the invention is that it allows for improved securing of a piece to a support. A further advantage of the invention is that it allows for an improved fastening of a support for a piece to a mobile device. Another advantage of the invention is that it allows for improved aesthetic appearance of a mobile device.

The term "comprising" as used in the claims does not exclude other elements or steps. The term "a" or "an" as used in the claims does not exclude a plurality.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon. Moreover, it should be appreciated that those skilled in the art, upon consideration of the present disclosure, may make modifications and/or improvements on the apparatus hereof and yet remain within the scope and spirit hereof as set forth in the following claims.

The invention claimed is:

1. An assembly for a mobile electronic device comprising:
    a piece of substantially decorative material shaped similar to a plate,
    a gasket, and
    a support comprised of a material which is hard to break relative to said piece of substantially decorative material, the support including at least one fastening element on a bottom side thereof, the at least one fastening element extending through the gasket for attaching the support to a frame,
    where said piece of substantially decorative material is fragile or brittle relative to said support,
    said piece of substantially decorative material comprising a front surface, a rear surface and sides, said support comprising a base plate, wherein the rear surface of said piece of substantially decorative material is secured to a substantially matching surface of the base plate and said support includes a rim that surrounds the sides of the piece of substantially decorative material, and wherein said piece is secured to the support by a bonding agent, and where said support and said gasket are a part of a casing of the mobile electronic device.

2. An assembly according to claim 1, wherein the at least one fastening element comprises a plurality of fastening elements for securing the support to the casing or the frame of the mobile device.

3. An assembly according to claim 2, wherein said fastening elements include clips.

4. An assembly according to claim 1, wherein said material of said piece of substantially decorative material comprises one of a ceramic, a glass, a mineral, a composite, a sapphire, a precious stone and a semi precious stone.

5. An assembly according to claim 4, wherein said piece of substantially decorative material comprises a gem stone.

6. An assembly according to claim 1, wherein said hard to break material comprises one of a metal, a metal alloy, a titanium, a titanium alloy, a gold, a gold alloy, a platinum, a platinum alloy, a metal alloy with amorphous atomic structure, or a fiber reinforced resin.

7. An assembly according to claim 1 wherein the bonding agent comprises one of a heat adhesive and a liquid adhesive.

8. An assembly according to claim 1, wherein the bonding agent comprises a double-sided adhesive tape.

9. An assembly according to claim 1, wherein said rim has a height that is less than a height of the sides of the piece.

10. An assembly according to claim 1 wherein said rim follows the contour of the piece and wherein there is a gap between the rim and the sides of the piece.

11. An assembly according to claim 1, wherein said base plate and said rim are formed by a unitary piece of said hard to break material.

12. An assembly according to claim 1, wherein said rim is provided with slanting inner edges and/or slanting outer edges.

13. An assembly according to claim 1, wherein the piece is secured to the support using a plastic seal around the sides of the piece and the piece is pushed with the plastic seal into the support.

14. A mobile electronic device including an assembly according to claim 1, wherein the mobile electronic device comprises at least one of a mobile phone, a media player, a camera, a palmtop computer, and a navigation device.

15. An assembly according to claim 1, wherein the piece is secured to the support using a plastic seal around the sides of the piece and a seal rim surrounding a back of the seal is squeezed in between edges of the piece and the rim of the support to provide a tight fit of the seal rim securing the piece to the support.

16. An assembly according to claim 1, wherein the base plate of the support includes an opening in which an acoustic tube is inserted.

17. An assembly according to claim 16, wherein the acoustic tube allows sound waves generated by a speaker of the electronic device to travel to an exterior, where the piece is provided with a similar channel that is placed above and connects to the acoustic tube.

18. An assembly according to claim 1, where a height of the rim being sufficient for protecting the sides of the piece.

19. A method for securing a piece of substantially decorative material shaped similar to a plate, the piece comprising a front surface, a rear surface and sides, the method comprising:
    providing a gasket,
    providing a support comprised of a material which is hard to break relative to said piece of substantially decorative material, said support including a base plate with a surface matching the rear surface of said piece, at least one fastening element located on a bottom portion of the support, and a rim shaped and dimensioned to surround the sides of said piece with a gap there between, the at least one fastening element extending through the gasket for attaching to a frame,
    placing said piece on the support to form an assembly, with the rear surface of the piece facing the base plate, and the rim of the support surrounding the sides of the piece,
    where said piece is fragile or brittle relative to said support, where said piece is secured to the support by a bonding agent, and where the support is a part of a casing of a mobile electronic device.

20. A method as in claim 19 where a height of the rim being sufficient for protecting the sides of the piece.

* * * * *